US012811316B2

(12) United States Patent
Kinkaid et al.

(10) Patent No.: US 12,811,316 B2
(45) Date of Patent: Nov. 24, 2026

(54) ATTACHABLE, ARMOR-PIERCING SHUNTING DEVICE

(71) Applicant: POWER FEED-THRU SYSTEMS AND CONNECTORS LLC, Deer Park, TX (US)

(72) Inventors: Roy Lee Kinkaid, Port Bolivar, TX (US); Brandon Lee Marbach, Spring, TX (US)

(73) Assignee: POWER FEED-THRU SYSTEMS AND CONNECTORS, LLC, Deer Park, TX (US)

( * ) Notice: Subject to any disclaimer, the term of this patent is extended or adjusted under 35 U.S.C. 154(b) by 544 days.

(21) Appl. No.: 18/344,473

(22) Filed: Jun. 29, 2023

(65) Prior Publication Data

US 2025/0007186 A1 Jan. 2, 2025

(51) Int. Cl.
*H01R 4/2483* (2018.01)
*E21B 41/00* (2006.01)

(52) U.S. Cl.
CPC ............ *H01R 4/2483* (2013.01); *E21B 41/00* (2013.01)

(58) Field of Classification Search
CPC ...... H01R 4/2483; H01R 9/031; H01R 43/20; H01R 4/44; H01R 11/11; H01R 4/70; H01R 4/2408; H01R 11/32; H01R 1/07; E21B 41/00
See application file for complete search history.

(56) References Cited

U.S. PATENT DOCUMENTS 3,816,818 A * 6/1974 Meier .................. H01R 12/675 439/492
4,460,229 A * 7/1984 Matthews ............ H01R 4/2416 439/409
5,756,972 A * 5/1998 Vranicar ............ H01R 13/5205 439/459
6,716,055 B1 * 4/2004 Echito .................. H01R 4/2406 439/417
11,431,114 B2 * 8/2022 Newman ................. H01R 11/11

* cited by examiner

*Primary Examiner* — Edwin A. Leon
(74) *Attorney, Agent, or Firm* — Alexander B. Uber; Gray Reed

(57) ABSTRACT

An attachable, armor-piercing shunting device utilizing a reversibly engageable enclosure configured to receive a cable such as an electric submersible pump cable. Piercing elements arranged around the enclosure body are passed through the enclosure body's sides to contact and penetrate any cable armor and shunt the cable. The enclosure body may be hinged with a reversible locking mechanism (such as a spring pin) to facilitate installation of the enclosure body around a cable.

9 Claims, 8 Drawing Sheets

ATTACHABLE, ARMOR-PIERCING SHUNTING DEVICE

BACKGROUND AND SUMMARY

Many oilfield operations utilize a permanent magnet motor (PMM) electric submersible pump (ESP) to pass through a wellhead. During these operations, it sometimes becomes necessary to shunt a cable. While a relatively straightforward process in other contexts, the unique circumstances and environmental factors of an oilfield, as well as the size and scale of the operations, complicate the requirements of both the cable being shunted and the shunting process itself.

Conventionally, an ESP cable is fed off a reel to a pump situated in a well. In such an arrangement, it is common practice to apply a shunt/ground to the end of the cable on the reel. If and when it becomes necessary to cut the cable from the reel (for example, in performing a cable-to-cable splice or connector termination at the packer and/or wellhead), any pre-installed shunt will be removed as one section of the cable is removed from the shunted section. Leaving the cable without a shunt could result in the personnel's handling of a live wire. Accordingly, it is important that the cable be properly shunted prior to cutting to avoid such risks.

That said, a conventional ESP cable is typically surrounded by armor to protect the more sensitive contents held within. As a result, conventional shunting techniques require considerable effort and tools to perform. Often these techniques involve grounding the armor and cutting into the cable before exposing the conductors and grounding them together. To perform this safely, those shunting the cable will need to wear the proper attire (including electrically-insulated/hot gloves) which only makes completing the task more difficult.

A shunting device in accordance with the present disclosure allows for a safer and more time-effective method of shunting an armored cable that may be performed in compliance with relevant safety guidelines (including the wearing of protective attire) while also eliminating the need for additional tools.

DETAILED DESCRIPTION

Figure 1:
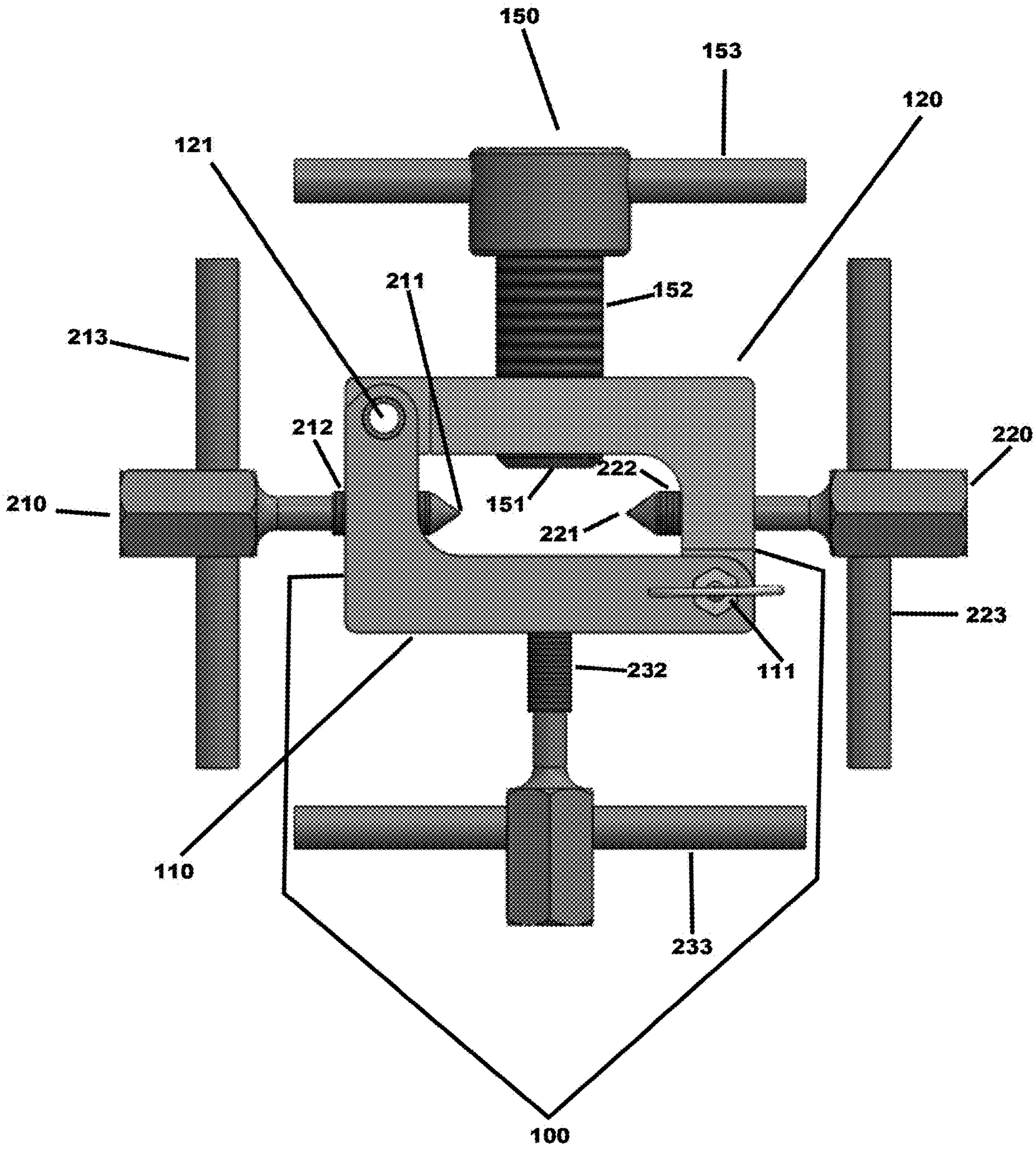
FIG. 1 depicts a side view of a shunting device in accordance with embodiments of the present disclosure.
Figure 2:
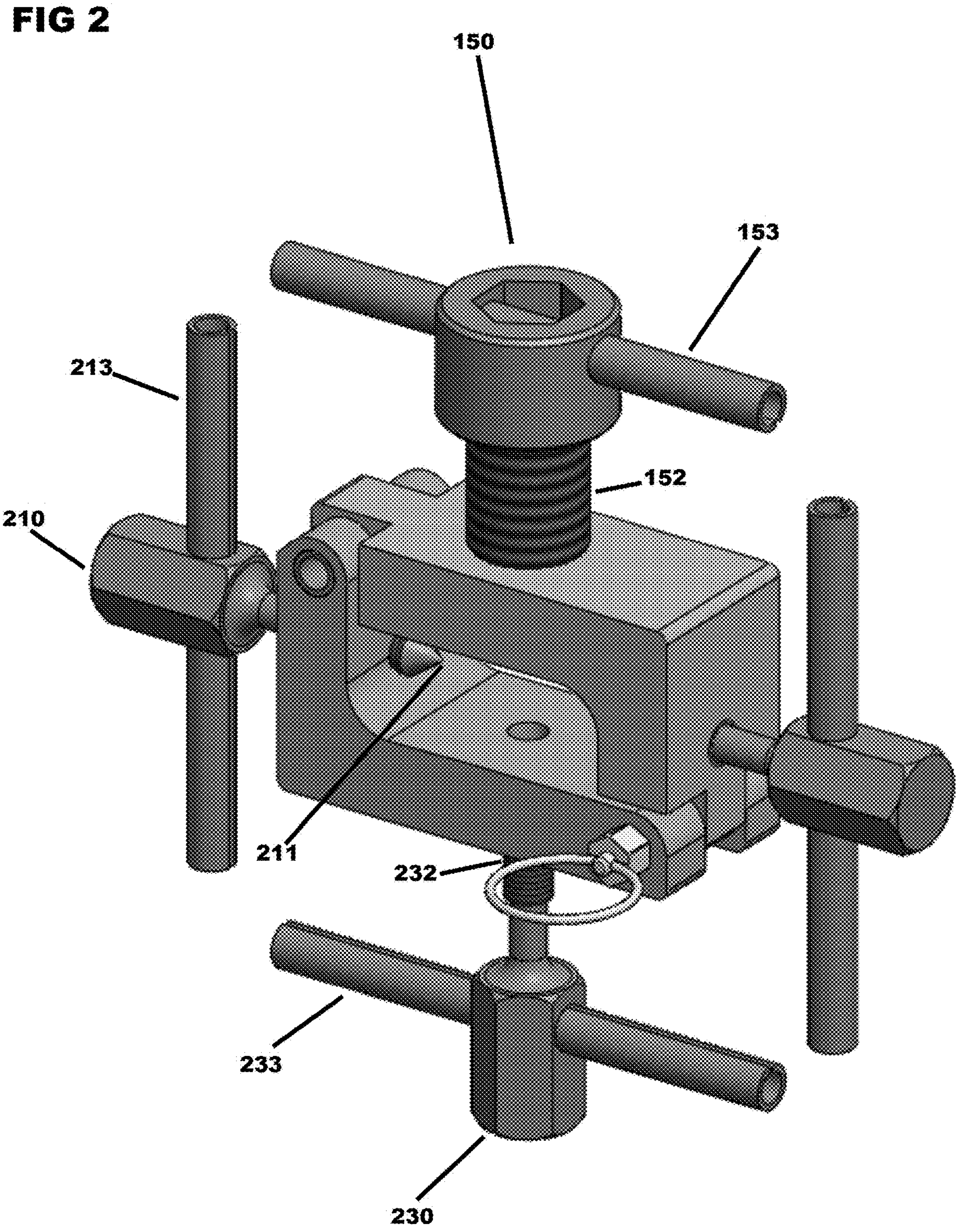
FIG. 2 depicts a side, perspective view of a shunting device in accordance with embodiments of the present disclosure.
Figure 3:
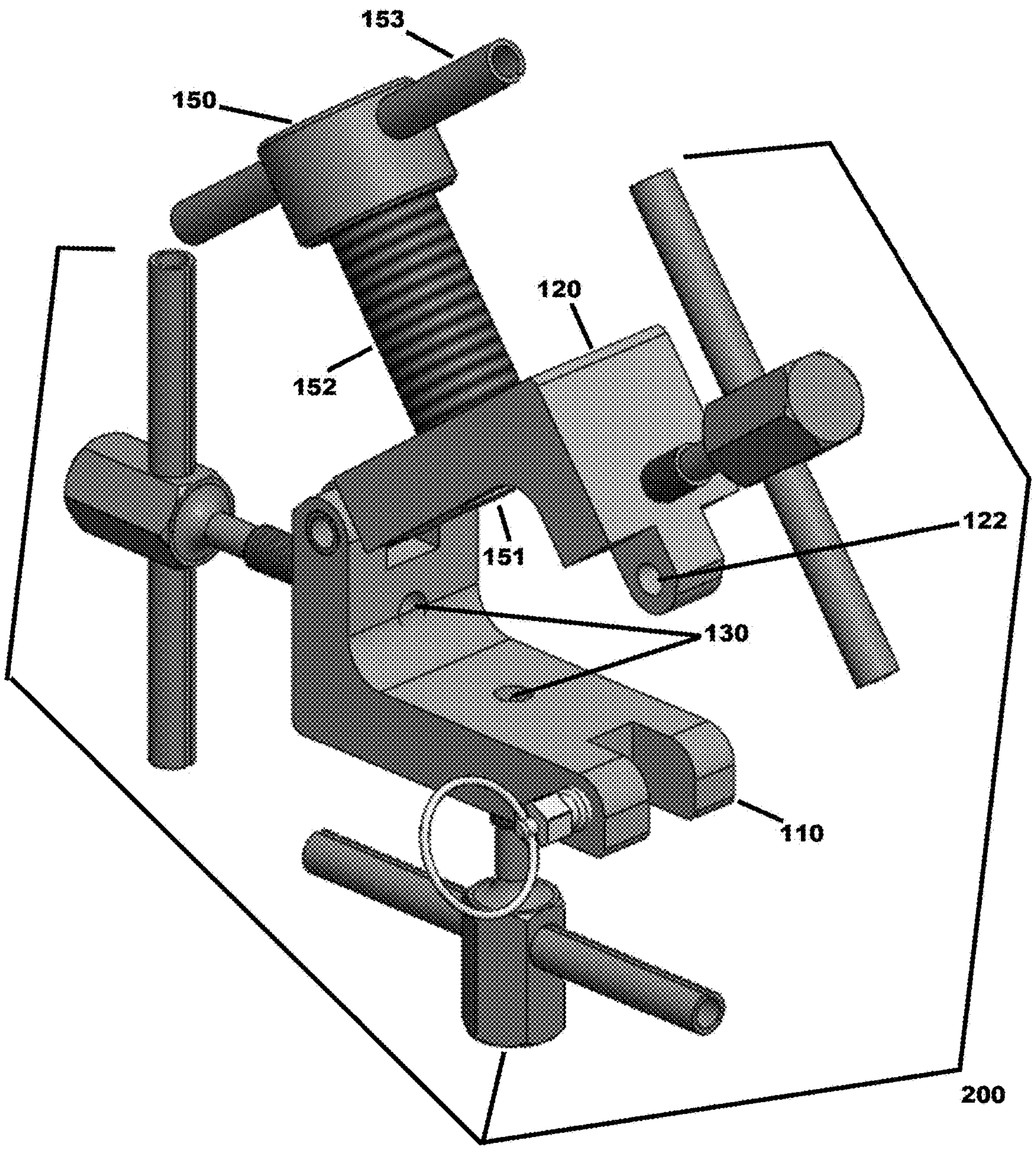
FIG. 3 depicts a side, perspective view of a shunting device in accordance with embodiments of the present disclosure.
Figure 4:
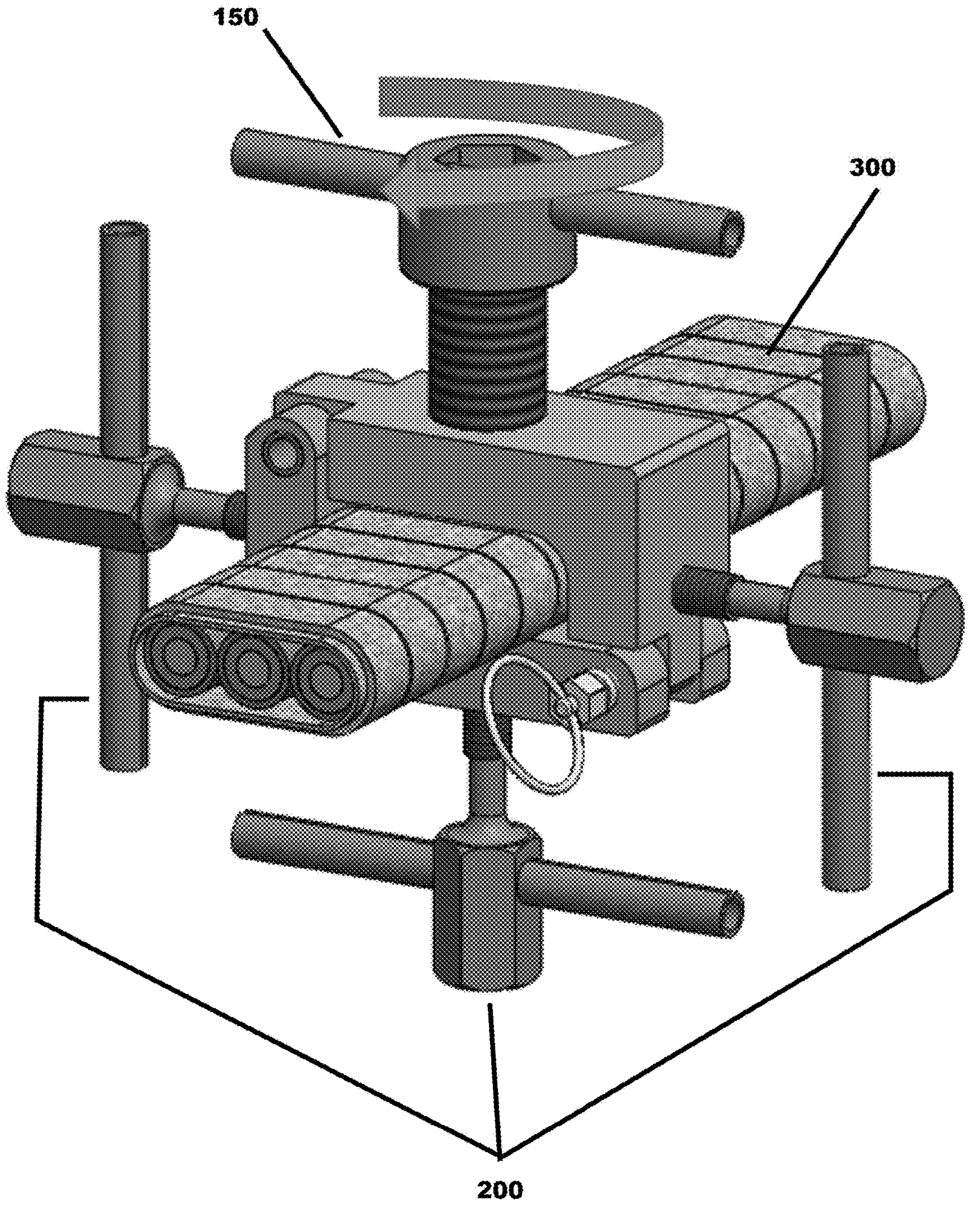
FIG. 4 depicts a side, perspective view of a shunting device with cable in accordance with embodiments of the present disclosure.

This description, with references to the figures, presents non-limiting examples of embodiments of the present disclosure. Embodiments of this disclosure relate generally to a shunting device capable of penetrating armored cables used, for example, in oil and gas operations. While this description may disclose embodiments that reference specific components or structures, it is not limited to such components or structures and includes any variations or modifications thereto that would be apparent to one of ordinary skill upon reading of this description.

In certain embodiments of the present disclosure, as illustrated in FIGS. 1-6C, an attachable, armor-piercing shunting device for attaching to a cable 300 may comprise an attachment body 100, a plurality of piercing elements 200, and a cable attachment element 150.

Attachment body 100 may comprise a first portion 110 and a second portion 120 which may be pivotably engaged at a pivot point 121. This pivotable engagement may be achieved through use of a hinge pin disposed at pivot point 121. Both first portion 110 and second portion 120 may be substantially L-shaped. When so engaged, each portion of attachment body 100 effectively act as jaws which may close around cable 300. First portion 110 may also include a locking mechanism 111. As depicted in the drawings, locking mechanism 111 may be a spring pin that is received in a corresponding pin-receiving aperture formed into second portion 120. When locking mechanism 111 is engaged (for example, when the spring pin is inserted into and contained within the corresponding aperture), the jaws of attachment body 100 are effectively closed and locked. When locked, first portion 110 and second portion 120 define an opening 160 configured to contain cable 300.

To secure cable 300 within opening 160 of attachment body 100, cable attachment element 150 may be employed. Cable attachment element 150 may be inserted through an attachment aperture 140 formed into a first side of second portion 120. Cable attachment element 150 may comprise a contact end 151 positioned within opening 160 after cable attachment element 150 is inserted through attachment aperture 140. Contact end 151 is configured to make direct contact with cable 300. Cable attachment element 150 may also comprise a threaded portion 152 that may threadedly engage with a corresponding threaded portion of attachment aperture 140. Cable attachment element 150 may further comprise a rotator 153 (depicted as a rotating arm or bar) to facilitate adjustment of the threaded engaged between cable attachment element 150 and second portion 120 via attachment aperture 140. Cable attachment element 150 may be a clamp screw as depicted in the drawings.

Additionally, a shunting device in accordance with embodiments of this disclosure may comprise a plurality of piercing elements 200. In the depicted embodiments, three piercing elements (210, 220, and 230) are used. Each piercing element of the plurality of piercing elements 200 may be substantially identical in structure though arranged in different positions around attachment body 100. For purposes of this description, an exemplary piercing element will be discussed though reference labels will be provided as correspond to the discussed structures for each piercing element depicted in the drawings.

A piercing element of the plurality of piercing elements 200 may comprise a substantially cylindrical member having a contact end (211, 221, 231) that is pointed or otherwise sharpened to facilitate penetration of any armor or other covering material around cable 300 when cable 300 is secured within opening 160 of attachment body 100. Attachment body 100 may comprise a plurality of openings 130 wherein each opening (131, 132, 133) corresponds to one piercing element of the plurality of piercing elements 200. Each of the openings 300 may be disposed around the various sides of attachment body 100 on either the first portion 110 or second portion 120 as depicted in the drawings. A person of ordinary skill in the art would recognize that any changes to shape or composition of attachment body 100 (or of cable 300) may result in arranging the openings 300 in different positions than those depicted. A piercing element may be threadedly engaged via its corresponding opening via a threaded portion (212, 222, 232) of the piercing element and threading within the opening (131, 132, 133). A piercing element may additionally comprise a rotator (213, 223, 233) (depicted as a rotating arm or bar) to facilitate adjustment of the threaded engagement between the piercing element and attachment body 100 via the corresponding opening of the plurality of openings 130.

To facilitate shunting of cable 300, a shunting device in accordance with this disclosure may be installed and used as follows. For user safety, it is recommended that the shunting device be used in conjunction with a voltage detection device and a grounding lead. Additionally, safety glasses and hot gloves should be worn by those installing the shunting device.

As would be recognized by one of ordinary skill, the size of the shunting device may vary from use to use depending on the size of the cable to be shunted. Once an appropriately-sized shunting device has been selected, each of the piercing elements (210, 220, 230) should be retracted until their pointed ends (211, 212, 213) do not extend into opening 160. Attachment body 100 may then be opened by disengaging the locking mechanism 111.

Figure 5:
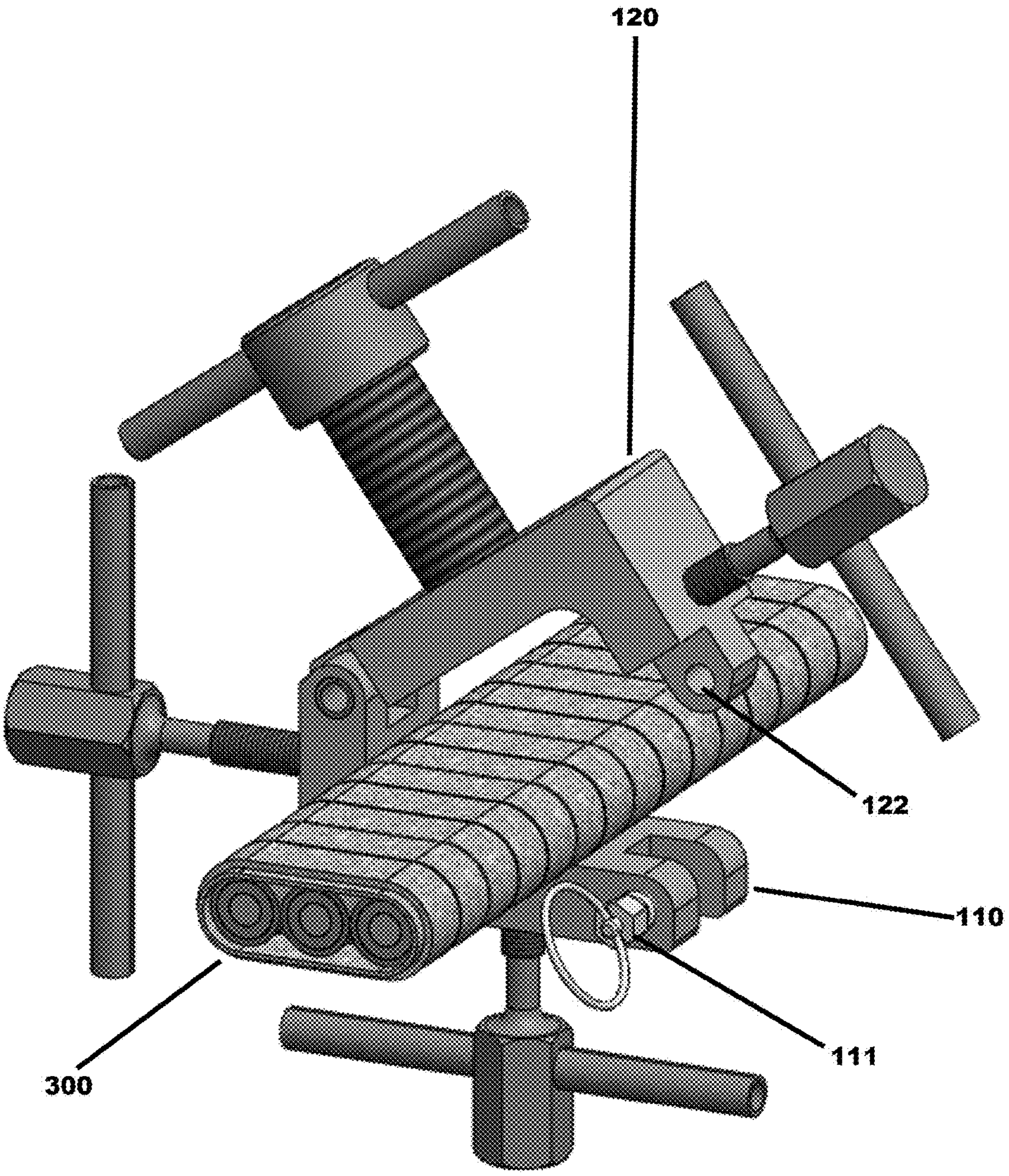
FIG. 5 depicts a side, perspective view of a shunting device with cable in accordance with embodiments of the present disclosure.

Shown in FIG. 5, cable 300 may then be place within attachment body 100. Keeping locking mechanism 111 disengaged, attachment body 100 may be closed around cable 300. Locking mechanism 111 may then be engaged (in the depicted embodiments by releasing the spring pin). If first portion 110 and second portion 120 are properly aligned, attachment body 100 will enclose cable 300 within opening 160.

Figure 6A:
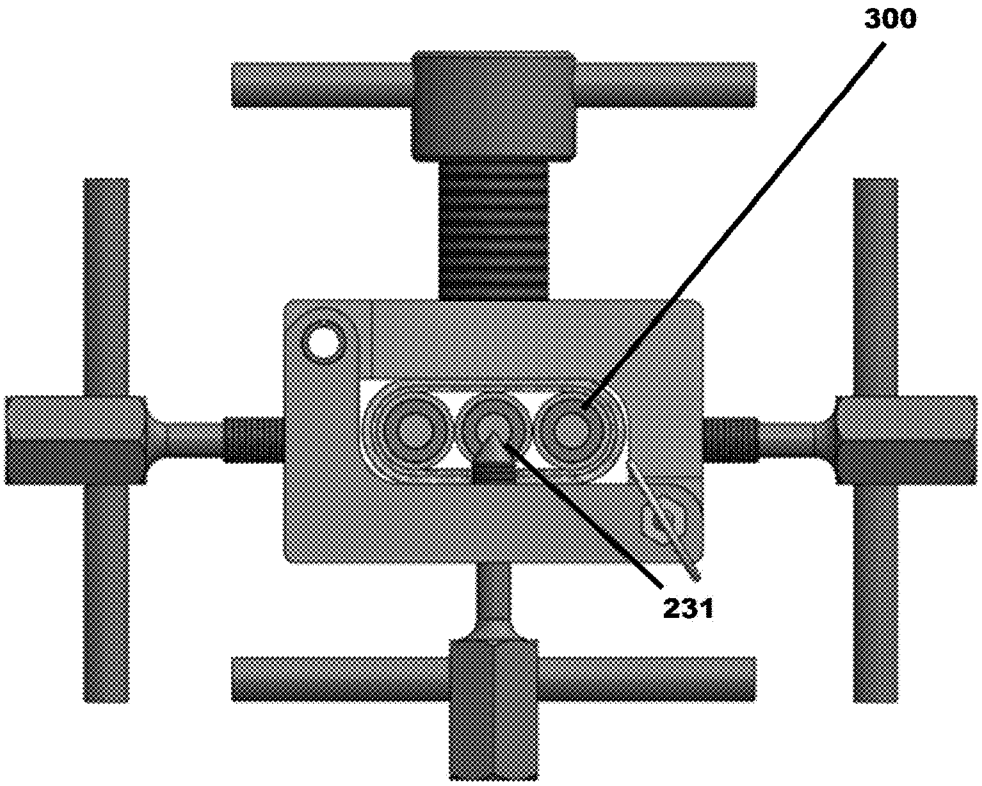
FIG. 6A depicts a side view of a shunting device with cable in accordance with embodiments of the present disclosure.
Figure 6B:
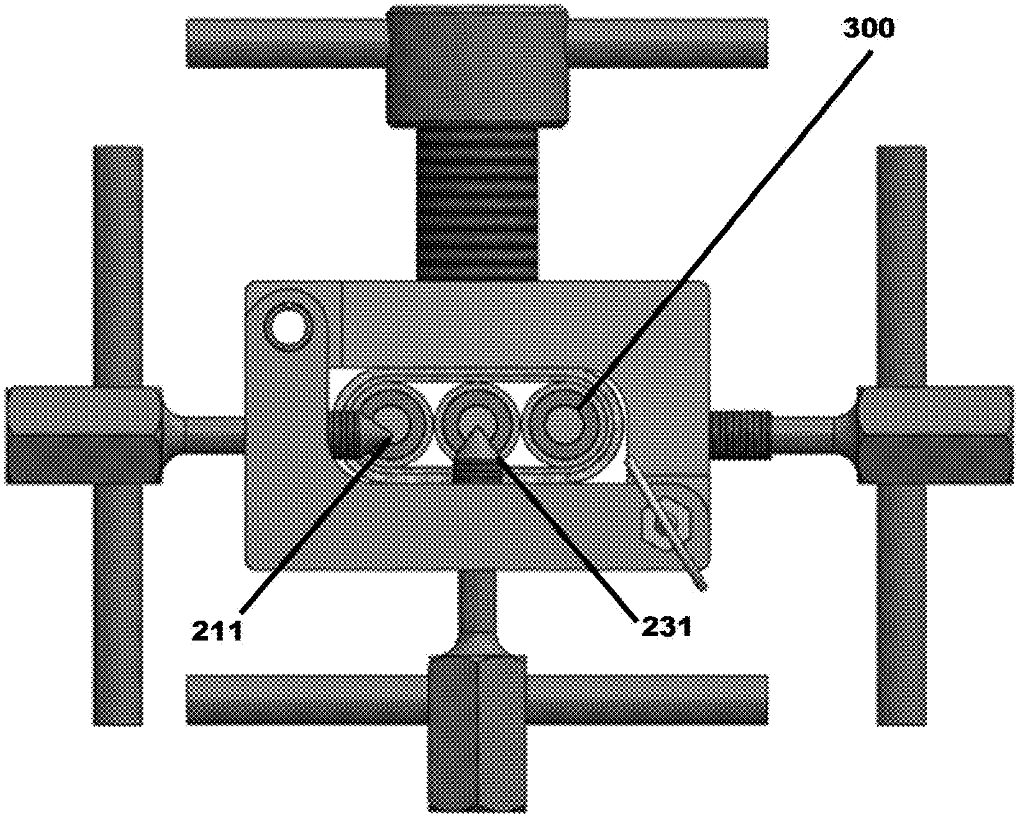
FIG. 6B depicts a side view of a shunting device with cable in accordance with embodiments of the present disclosure.
Figure 6C:
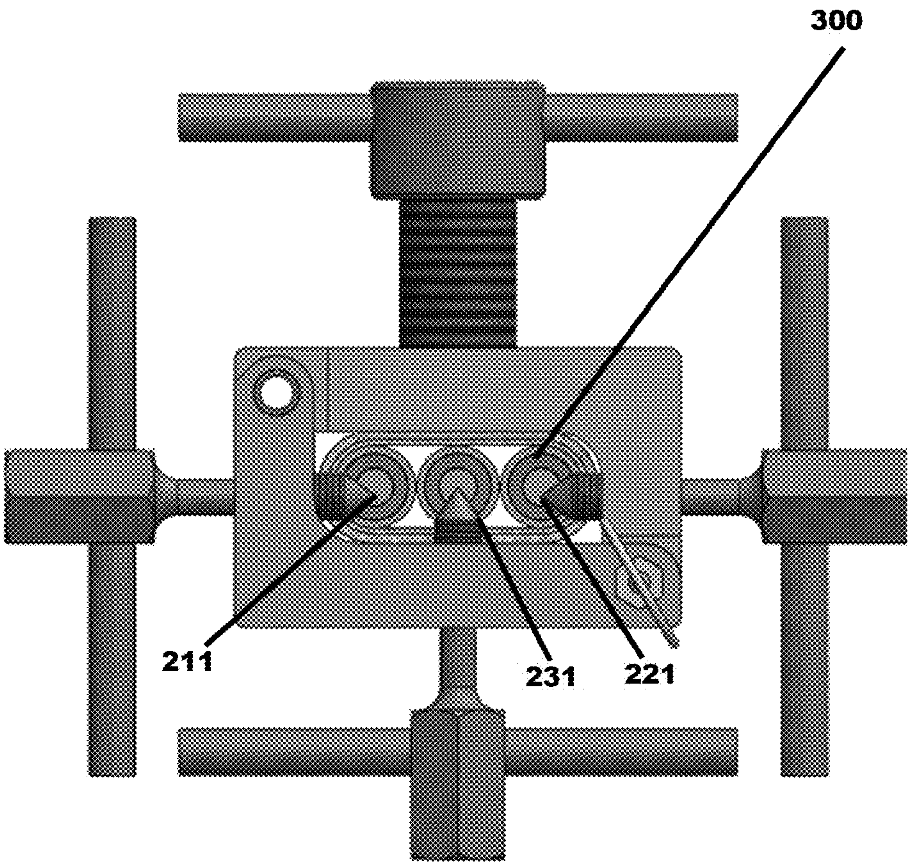
FIG. 6C depicts a side view of a shunting device with cable in accordance with embodiments of the present disclosure.

Shown in FIGS. 6A-C, rotational force may then be applied to rotator 153 of cable retention element 150. This force may be applied manually and should continue until contact end 151 is contacting the exterior of cable 300 and keeping cable 300 securely retained in opening 160. Then, piercing element 220 may be tightened by manually applying force to rotator 223 until threaded portion 222 are only exposed within opening 160 and pointed end 221 has penetrated any armor or other covering material around cable 300. Piercing element 210 may then be tightened by manually applying force to rotator 213 until threaded portion 212 are only exposed within opening 160 and pointed end 211 has penetrated any armor or other covering material around 300. Piercing element 230 may then be tightened by manually applying force to rotator 233 until threaded portion 232 are only exposed within opening 160 and pointed end 231 has penetrated any armor or other covering material around cable 300.

Once all piercing elements have been installed, a grounding lead can optionally be attached to the shunting device or armor around cable 300. After this is completed, cable 300 has been shunted and is ready to be cut or otherwise separated from the reel.

The invention claimed is:

1. An attachable, armor-piercing shunting device comprising:

an enclosure body configured to receive a cable, said enclosure body comprising:

a first enclosure section configured for direct engagement with a second enclosure section, wherein said first enclosure section is reversibly engaged to said second enclosure section, wherein said first enclosure section and said second enclosure section define an enclosure aperture when engaged;

at least one piercing element configured to penetrate an outer layer of said cable, wherein a first piercing element of said at least one piercing element is further configured to extend through said enclosure body into said enclosure aperture.

2. The shunting device of claim 1 further comprising a cable retention element, wherein said cable retention element is configured to extend through said enclosure body into said enclosure aperture, wherein said cable retention element has a substantially blunted contact end.

3. The shunting device of claim 2 wherein said first enclosure section and said section enclosure section are pivotably coupled at a pivot point and reversibly engaged via a locking mechanism.

4. The shunting device of claim 3 wherein said locking mechanism is a spring pin.

5. The shunting device of claim 4 wherein said first enclosure section and said second enclosure section are substantially L-shaped.

6. The shunting device of claim 1 wherein said first piercing element extends through a first side of said first enclosure section, wherein a second piercing element of said at least one piercing element extends through a second side of said first enclosure section, and wherein a third piercing element of said at least one piercing element extends through a first side of said second enclosure section that is substantially opposite said second side of said first enclosure section.

7. The shunting device of claim 6 wherein each piercing element of said at least one piercing element is threaded, wherein each piercing element of said at least one piercing element extends through a corresponding threaded bore disposed in said enclosure body.

8. The shunting device of claim 7 further comprising a cable retention element, wherein said cable retention element is configured to extend a second side of said second enclosure section into said enclosure aperture, wherein said second side of said second enclosure section is substantially opposite said first side of said first enclosure section, and wherein said cable retention element has a substantially blunt contact end.

9. The shunting device of claim 8 wherein said cable retention element is threaded and extends through a corresponding threaded retainer bore disposed in said enclosure body.

* * * * *